United States Patent
Hayama et al.

(10) Patent No.: US 9,328,308 B2
(45) Date of Patent: May 3, 2016

(54) LUBRICATING GREASE COMPOSITION

(71) Applicants: KYODO YUSHI CO., LTD., Fujisawa-shi (JP); DENSO CORPORATION, Kariya-shi (JP); UNIVERSITY OF TSUKUBA, Tsukuba-shi (JP)

(72) Inventors: Makoto Hayama, Chigasaki (JP); Hitoshi Kuno, Nisshin (JP); Masao Nagakubo, Miyoshi (JP); Shozo Ikejima, Okazaki (JP); Makoto Watanabe, Tsukuba (JP)

(73) Assignees: KYODO YUSHI CO., LTD., Kanagawa (JP); DENSO CORPORATION, Aichi (JP); UNIVERSITY OF TSUKUBA, Ibaraki (JP)

( * ) Notice: Subject to any disclaimer, the term of this patent is extended or adjusted under 35 U.S.C. 154(b) by 0 days.

(21) Appl. No.: 14/379,631

(22) PCT Filed: Feb. 21, 2013

(86) PCT No.: PCT/JP2013/054358
§ 371 (c)(1),
(2) Date: Aug. 19, 2014

(87) PCT Pub. No.: WO2013/125644
PCT Pub. Date: Aug. 29, 2013

(65) Prior Publication Data
US 2015/0024982 A1 Jan. 22, 2015

(30) Foreign Application Priority Data
Feb. 21, 2012 (JP) ................. 2012-035294

(51) Int. Cl.
| | |
|---|---|
| C10M 141/10 | (2006.01) |
| C10M 169/04 | (2006.01) |
| A01N 47/48 | (2006.01) |
| C10M 137/10 | (2006.01) |
| C10M 133/22 | (2006.01) |
| C10G 45/00 | (2006.01) |
| C10G 3/00 | (2006.01) |
| C10M 169/02 | (2006.01) |
| F16C 33/66 | (2006.01) |

(52) U.S. Cl.
CPC .............. *C10M 133/22* (2013.01); *C10G 3/50* (2013.01); *C10G 45/00* (2013.01); *C10M 169/02* (2013.01); *C10M 2201/1056* (2013.01); *C10M 2203/0206* (2013.01); *C10M 2205/183* (2013.01); *C10M 2207/1256* (2013.01); *C10M 2215/1026* (2013.01); *C10N 2230/02* (2013.01); *C10N 2230/06* (2013.01); *C10N 2230/08* (2013.01); *C10N 2230/56* (2013.01); *C10N 2240/04* (2013.01); *C10N 2250/10* (2013.01); *F16C 33/6633* (2013.01); *Y02P 30/20* (2015.11)

(58) Field of Classification Search
CPC ................... C10N 2220/022; C10N 2207/125; C10N 2219/06
USPC ......................................... 508/110, 161, 386
See application file for complete search history.

(56) References Cited

U.S. PATENT DOCUMENTS

| | | | |
|---|---|---|---|
| 7,943,557 B2 | 5/2011 | Egami | |
| 2010/0120643 A1 | 5/2010 | Brown et al. | |
| 2011/0021850 A1 | 1/2011 | Battersby | |
| 2012/0322707 A1* | 12/2012 | Bredsguard et al. | 508/465 |

FOREIGN PATENT DOCUMENTS

| | | |
|---|---|---|
| CN | 101194004 A | 6/2008 |
| CN | 101652456 A | 2/2010 |
| EP | 2135924 A1 | 12/2009 |
| JP | 3-23593 B2 | 3/1991 |
| JP | 3223210 B2 | 8/2001 |
| JP | 2007-321042 A | 12/2007 |
| JP | 2010-252700 A | 11/2010 |
| WO | WO 2009/071629 | 6/2009 |

OTHER PUBLICATIONS

International Search Report (PCT/ISA/210) mailed on May 14, 2013, by the Japanese Patent Office as the International Searching Authority for International Application No. PCT/JP2013/054358.
Written Opinion (PCT/ISA/237) mailed on May 14, 2013, by the Japanese Patent Office as the International Searching Authority for International Application No. PCT/JP2013/054358.
Botryococcus braunii: a rich source for hydrocarbons and related ether lipids, Appl. Microbiol. Biotechnol., 2005, 66, pp. 486-496.
Proceeding of JAST Conference, Tokyo, May 2011 of Japanese Society of Tribologists, pp. 239-240 with English language translation.
Office Action and Search Report issued by the Chinese Patent Office in corresponding Chinese Patent Application No. 201380010312.4 on May 28, 2014 (7 pages).

* cited by examiner

*Primary Examiner* — Vishal Vasisth
(74) *Attorney, Agent, or Firm* — Buchanan, Ingersoll & Rooney PC

(57) ABSTRACT

The invention provides a grease composition containing a thickener and a base oil, wherein the base oil contains (a) a hydrocarbon oil extracted from *Botryococcus braunii* and/or (b) a hydrocarbon oil obtainable by hydrogenating the hydrocarbon oil (a).

22 Claims, No Drawings

LUBRICATING GREASE COMPOSITION

This application is a 371 of PCT/JP2013/054358, filed Feb. 21, 2013.

TECHNICAL FIELD

The present invention relates to a grease composition comprising *Botryococcus* oil extracted from a green alga, *Botryococcus braunii* (hereinafter expressed as *Botryococcus*) and/or a hydrogenated *Botryococcus* oil. The grease composition of the invention can suitably be used for lubrication parts of a clutch or torque limiter mechanism or a power transmission mechanism. The grease composition of the invention can also suitably be used for lubricating the bearings.

BACKGROUND ART

In view of the environmental problems on the earth, fats and oils derived from animals and plants have been reviewed and the biofuels have been researched because they are considered to make carbon neutral and therefore lower the burden on the environments. The hydrocarbon obtainable from a green alga, *Botryococcus braunii*, which belongs to the microalgae is regarded as promising substitute for oil because pure hydrocarbons can be obtained by mass production (JP 2010-252700 A).

As another measure for the environmental problems, weight reduction of automobiles has been advancing in order to lower the greenhouse gas. In line with the weight reduction of automobiles, clutch or torque limiter mechanism is adopted in more parts and operated more frequently than conventional. Therefore, the clutch or torque limiter mechanism generally employs grease compositions where a silicone oil with excellent torque transmission performance, a traction oil such as synthetic naphthene oil or the like is used as the base oil (JP 3223210 and JP (Hei) 03-23593 B). However, the silicone oil-based grease has the problem of susceptibility to wearing, and on the other hand, the traction oil such as synthetic naphthene oil or the like has the problem of poor heat resistance. As the measures against wearing and low heat-resistance, use of squalene extracted from shark livers and squalane has been discussed (JP 2007-321042 A). Unfavorably, however, the traction coefficient of squalene or squalane is lower than that of the silicone oil or the traction oils such as synthetic naphthene oil or the like.

The automobiles are required to save energy, for example, to show good fuel efficiency. The lubricant is thus required to show low torque performance, and the base oil with low viscosity has been employed for the lubricant. However, the oil film obtainable from the low-viscosity oil becomes thin, which will impair the lubricating properties and reduce the life (flaking life). Then, the oil is required to contribute to the formation of a thick oil film even though the viscosity is low. Namely, the oil with a high viscosity-pressure coefficient (a) is needed. The recent research has demonstrated that base oils having high viscosity-pressure coefficient (a) are effective for preventing the bearings from electrical pitting (Proceedings of JAST Conference (Tokyo, 2011-5) of Japanese Society of Tribologists, p 239-240).

SUMMARY OF INVENTION

Technical Problem

An object of the invention is to provide a grease composition that can show superior wear resistance and higher heat resistance than conventional lubricants or grease compositions, and in addition, exhibit satisfactory lubricating properties and a long flaking life, and prevent the bearings from electrical pitting although the torque transmission properties are equal to or higher than those of conventional lubricants or grease compositions.

Solution to Problem

As a result of extensive studies to solve the above-mentioned problems, the inventors of the present invention have found that it is possible to obtain a grease composition having the torque transmission properties equal to those of the conventional silicone grease and traction oil, and at the same time, exhibiting excellent wear resistance and high heat resistance by using *Botryococcus* oil and/or the hydrogenated *Botryococcus* oil for the base oil. Further, the inventors have confirmed that the viscosity-pressure coefficient (a) at 25° C. of the *Botryococcus* oil and/or the hydrogenated *Botryococcus* oil is as high as 20 or more, to accomplish the invention.

Accordingly, the invention provides a grease composition shown below.

(1) A grease composition comprising a thickener and a base oil, wherein the base oil comprises;

(a) a hydrocarbon oil extracted from *Botryococcus braunii* and/or (b) a hydrocarbon oil obtainable by hydrogenating the hydrocarbon oil (a).

(2) The grease composition as described in the above-mentioned item (1), wherein the hydrocarbon oil (a) is produced by extracting from *Botryococcus braunii* with hexane.

(3) The grease composition as described in the above-mentioned item (1) or (2), wherein the hydrocarbon oil (a) is a hydrocarbon oil extracted from *Botryococcus braunii* deposited as the Accession No. tsukuba-1 FERM P-22046.

(4) The grease composition as described in any one of the above-mentioned items (1) to (3), wherein the hydrocarbon oil (a) is a branched hydrocarbon oil having a triterpene structure composed of isoprene units.

(5) The grease composition as described in any one of the above-mentioned items (1) to (4), wherein the hydrocarbon oil (a) comprises methyl group.

(6) The grease composition as described in any one of the above-mentioned items (1) to (5), wherein the hydrocarbon oil (a) comprises a hydrocarbon represented by the following chemical formula 1:

[Chemical Formula 1]

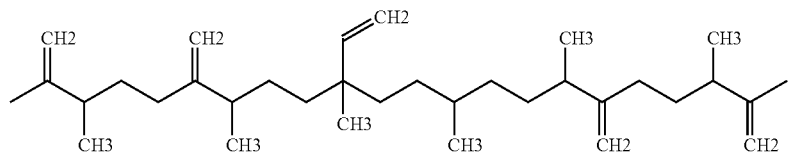

(7) The grease composition as described in any one of the above-mentioned items (1) to (6), wherein the hydrocarbon oil (a) and/or the hydrogenated hydrocarbon oil (b) is contained in an amount of 10 mass % or more with respect to the total mass of the base oil.

(8) The grease composition as described in any one of the above-mentioned items (1) to (7), wherein the thickener is at least one selected from the group consisting of metallic soaps, complex metallic soaps, urea compounds and silica.

(9) The grease composition as described in any one of the above-mentioned items (1) to (8), wherein the thickener is a urea compound represented by the following formula (2):

$$R_1\text{—NHCONH—}R_2\text{—NHCONH—}R_3 \quad (2)$$

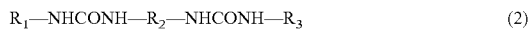

wherein $R_1$ and $R_3$ may be the same or different from each other and are each independently a hydrocarbon group having 4 to 20 carbon groups, and $R_2$ is an aromatic hydrocarbon group having 6 to 15 carbon atoms.

(10) A power transmission mechanism wherein the grease composition as described in any one of the above-mentioned items (1) to (9) is enclosed.

(11) A bearing wherein the grease composition as described in any one of the above-mentioned items (1) to (9) is enclosed.

Effects of Invention

The grease composition according to the invention can exhibit more satisfactory wear resistance and heat resistance than the conventional lubricants and grease compositions, with the torque transmission performance being equal to or higher than that of the conventional lubricants and grease compositions. Because of the presence of a base oil having a high viscosity-pressure coefficient (a) at 25° C., the grease composition of the invention can show excellent lubrication properties and a long flaking life and prevent the bearings from electrical pitting.

DESCRIPTION OF EMBODIMENTS

<Base oil>

The base oil used in the invention comprises (a) a hydrocarbon oil extracted from *Botryococcus braunii* (referred to as *Botryococcus* oil) and/or (b) a hydrocarbon oil obtainable by hydrogenating the hydrocarbon oil (a) (referred to as hydrogenated *Botryococcus* oil).

For the step of extraction, hydrophobic organic solvents such as hexane and the like may be used. Hexane is particularly preferred. The hydrocarbon oil (a) may preferably be a branched hydrocarbon oil having a triterpene structure composed of isoprene units. More preferably, the hydrocarbon oil (a) may comprise methyl group. Particularly, the hydrocarbon oil (a) may preferably comprise a hydrocarbon represented by the following chemical formula 1. It is particularly preferable that the hydrocarbon oil (a) contain the hydrocarbon represented by the following formula 1 in an amount of 98 mass % or more.

The above-mentioned *Botryococcus* oil or hydrogenated *Botryococcus* oil may be used alone as the base oil. Alternatively, other base oil components may be used in combination. Those base oil components that can be used in combination with the *Botryococcus* oil or hydrogenated *Botryococcus* oil are not particularly limited. Specific examples of those base oil components include mineral oils; and a variety of synthetic oils, e.g., ester type synthetic oils including diesters such as dioctyl sebacate and the like, and polyol esters; synthetic hydrocarbon oils including poly α-olefins and polybutene; ether type synthetic oils including alkyl diphenyl ethers and polypropylene glycols; silicone oils; fluorinated oils and the like.

When other base oil components are used, the above-mentioned hydrocarbon oil (a) and/or the hydrogenated hydrocarbon oil (b) may preferably be contained in an amount of 10 mass % or more with respect to the total mass of the base oil. In particular, the base oil consisting of 100 mass % of the *Botryococcus* oil or hydrogenated *Botryococcus* oil is most preferable.

The kinematic viscosity at 40° C. of the base oil may preferably be in the range of 10 to 120 mm²/s, more preferably 10 to 100 mm²/s, and most preferably 10 to 30 mm²/s. When the viscosity is too low, the oil film with a sufficient thickness cannot be formed, which may have an adverse effect on the fatigue life. Too high viscosity may unfavorably affect the torque performance.

The viscosity-pressure coefficient (a) of the base oil may preferably be 20 to 70 GPa$^{-1}$, and more preferably 25 to 65 GPa$^{-1}$. When the value α is 20 GPa$^{-1}$ or more, a sufficient thickness of the oil film can be ensured even though the viscosity of the base oil is low. Namely, it is possible to provide a grease composition with excellent lubricating properties and a long flaking life. In addition, when the base oil has a value α of 20 GPa$^{-1}$ or more, the resultant grease composition can effectively prevent the bearings from electrical pitting.

The viscosity-pressure coefficient (a) can be obtained according to the following formula of Hamrock-Dowson:

[Mathematical Formula 1]

Central oil film thickness $H_c = 2.69 G^{0.53} U^{0.67} W^{-0.067}$
$(1 - 0.61\exp(-0.73 k))$  (*1) Hamrock-Dowson formula wherein a load parameter $W = w/(E'R_x^2)$, a material parameter $G = \alpha E'$, a speed parameter $U = \eta_0 \bar{u}/(E'R_x)$, in which w is a load per unit width, E' is an equivalent Young's modulus, $R_x$ is an equivalent radius, a is a viscosity-pressure coefficient, $\eta_0$ is a viscosity under atmospheric pressure at the gateway to the rolling contact portion, $\bar{u}$ is an average peripheral speed, and k is a contact ellipse ratio.

The base oil may preferably have a flash point of 170° C. or more, and more preferably 200° C. or more. By using such a base oil having a flash point as mentioned above, the resultant grease can be provided with excellent heat resistance.

The *Botryococcus* oil can be obtained by the following method, for example.

[Chemical Formula 1]

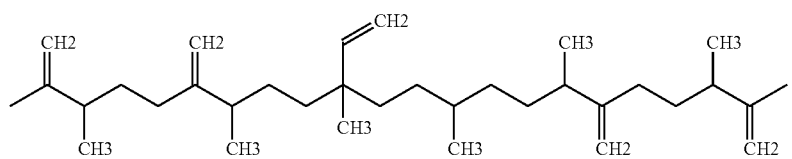

(1) Extraction of Hydrocarbon Oil

Botryococcus is cultured up to a predetermined concentration, and then concentrated. The term "to concentrate" herein used means separation of the alga from water as far as possible. The alga Botryococcus herein used is deposited in the International Patent Organism Depositary (IPOD) of National Institute of Advanced Industrial Science and Technology (1-1, Higashi 1-chome, Tsukuba city, Ibaraki pref., Japan) as the Accession No. tsukuba-1 FERM P-22046 (date of deposition: Dec. 9, 2010). This type of Botryococcus is called RaceB.

The concentrated Botryococcus is scattered in a shallow container with opening top (e.g., a vat or the like) and dried. For drying, warm air drying or sun-drying may be available. When the warm air drying is employed, for example, Botryococcus may be exposed to warm air of 70 to 80° C. for 20 to 40 hours.

The Botryococcus thus dried was cut into fine pieces with scissors and immersed in hexane. Generally about one time as much hexane as dried alga by volume is used. After immersed, the Botryococcus was allowed to stand for several hours. The temperature of hexane where the Botryococcus is immersed is not particularly limited. The oil component in the Botryococcus is eluted therefrom with hexane during the immersion. The resultant hexane is subjected to fractional distillation using an evaporator, thereby extracting an oil fraction (including hydrocarbon oil and lipids such as triglyceride and the like). The oil fraction thus extracted is allowed to pass through a silica gel column. In this case, consideration should be given to the choice of a liquid phase used in the chromatography so that only the hydrocarbon oil can pass through the silica gel column. The hydrocarbon oil which has passed through the silica gel column is obtained as the Botryococcus oil.

(2) Production of Hydrogenated Hydrocarbon Oil

The hydrocarbon oil obtained in the above-mentioned step (1) is placed in a reaction vessel of an autoclave in a stream of argon in the presence of a catalyst (e.g., Pd—C) and a solvent (e.g., ethyl acetate). In this case, the volume of hydrocarbon oil may be about 1/10 times the capacity of the reaction vessel, and the volume of catalyst may be about 1/10 times the volume of the hydrocarbon oil to be charged, and the volume of solvent may be about 1/3 times the capacity of the reaction vessel. Then, with the reaction vessel of autoclave being charged with hydrogen, stirring is initiated. Stirring is continued with hydrogen being additionally introduced into the reaction vessel of autoclave as the consumption of hydrogen.

It is preferable to terminate the reaction when absorption of hydrogen is no longer observed. However, the reaction may be interrupted. In the latter case, there remains a double bond in the structure of the obtained hydrocarbon oil. After the atmosphere is replaced with argon gas in the reaction vessel of autoclave, the reaction liquid is filtered through Celite and the catalyst (Pd—C) is subjected to filtration, and the filtrate is sufficiently washed with ethyl acetate or the like. The filtrate is concentrated under reduced pressure to obtain a residue, which is regarded as the hydrogenated Botryococcus oil.

<Thickener>

Any thickeners that can be generally used for grease compositions may be employed with no limitation in the invention. Specific examples of the thickener include metallic soaps, complex metallic soaps, urea compounds, urethane compounds, carbon black, bentonite, silica compounds, polytetrafluoroethylene (PTFE) and the like. The thickener selected from the group consisting of metallic soaps, complex metallic soaps, urea compounds and silica (silicon dioxide) is preferable.

Specific examples of the metallic soap include aluminum soap, calcium soap, lithium soap, sodium soap, barium soap and the like. In particular, lithium soap is preferred.

Specific examples of the complex metallic soap include lithium complex soap, calcium complex soap, aluminum complex soap and the like.

The urea compounds include diurea compounds. In particular, diurea compounds obtainable by reacting an aromatic diisocyanate with an aromatic amine, an aliphatic amine, an alicyclic amine or a mixture of two or more amines mentioned above can be used. The diurea compound can be represented by the following formula (2), for example. Of the above, diurea compounds obtainable by the reaction with an aliphatic amine, an alicyclic amine or the mixture thereof are preferable.

$$R_1\text{—NHCONH—}R_2\text{—NHCONH—}R_3 \quad (2)$$

wherein $R_1$ and $R_3$ may be the same or different from each other and are each independently a hydrocarbon group having 4 to 20 carbon groups, for example, an aliphatic hydrocarbon group, alicyclic hydrocarbon group or aromatic hydrocarbon group; and $R_2$ is an aromatic hydrocarbon group having 6 to 15 carbon atoms.

Specific examples of the aromatic diisocyanate include tolylene diisocyanate, diphenylmethane diisocyanate, naphthalene diisocyanate, and the like. Specific examples of the aromatic amine include p-toluidine, aniline, naphthylamine, and the like. Specific examples of the aliphatic amine include octylamine, nonylamine, decylamine, undecylamine, dodecylamine, tridecylamine, tetradecylamine, pentadecylamine, hexadecylamine, heptadecylamine, octadecylamine, nonyldecylamine, eicosylamine and the like. Specific examples of the alicyclic amine include cyclohexylamine and the like. Of the above, urea compounds obtainable from an aromatic diisocyanate with an aliphatic amine, an alicyclic amine or the mixture thereof are preferable. In particular, urea compounds prepared by reacting diphenylmethane diisocyanate (as the aromatic diisocyanate) with octadecylamine (as the aliphatic amine), cyclohexylamine (as the alicyclic amine) or the mixture thereof are preferred.

When silica (silicon dioxide) is used, the primary particles may preferably have an average particle size of 0.1 μm or less, and more preferably 0.05 μm or less.

<Additives>

The lubricating grease composition of the invention may further comprise various additives commonly used for general lubricating grease compositions, such as an antioxidant, extreme-pressure agent, rust preventive, surfactant and the like. The amount of such additive may be generally in the range of 0.01 to 10 mass %.

The consistency of the grease composition according to the invention may preferably be 200 to 400. The thickener may be added to such an extent that the above-mentioned consistency can be obtained. To be more specific, the thickener may be contained in an amount of 3 to 30 mass %, more preferably 5 to 25 mass %, based on the total mass of the grease composition.

The grease composition of the invention can suitably be used for lubrication parts of the clutch or torque limiter mechanism or the power transmission mechanism. The grease composition of the invention can also be advantageously used for lubricating the bearings.

EXAMPLES

Following the formulation as stated in Table 1 of the accompanying sheet, a grease composition was produced in each of Examples and Comparative Example 1. Then, the physical properties were evaluated in accordance with the methods shown below. In Comparative Examples 2 to 4, commercially available products were used. The products in the form of grease were subjected to evaluations in Comparative Examples 2 and 3; and the product in the form of oil was subjected to evaluations in Comparative Example 4.

(Preparation of *Botryococcus* Oil)

The *Botryococcus* oil used in each Example was obtained by the following method.

*Botryococcus* deposited in the International Patent Organism Depositary (IPOD) of National Institute of Advanced Industrial Science and Technology as the Accession No. tsukuba-1 FERM P-22046 was cultured in water at room temperature for 30 days. The culture was moved to a large vat and dried in the sun to separate the alga from water.

The dried *Botryococcus* was cut into fine pieces with scissors and immersed in about one time as much hexane as dried *Botryococcus* by volume at room temperature. With the temperature being maintained, the *Botryococcus* was allowed to stand for about two hours so that the oil component accumulated in *Botryococcus* could be eluted therefrom with hexane. The resultant hexane was subjected to fractional distillation using an evaporator, thereby extracting an oil fraction (a mixture of hydrocarbon oil and lipids). The oil fraction thus extracted was allowed to pass through a silica gel column (Wakogel C-100) to separate the hydrocarbon oil.

The composition of the hydrocarbon oil thus obtained was analyzed using a gas chromatography flame ionization detector (GC-FID) and a gas chromatography mass spectrometer (GC-MS). As a result, the composition was found to be represented by formula: $C_{34}H_{58}$.

As a result of the composition analysis and the molecular structure analysis, the obtained hydrocarbon was identified as $C_{34}H_{58}$ having a molecular structure of the following chemical formula 1:

Example 2

A whole amount of the base oil and a whole amount of the thickener shown in Table 1 were placed in a reaction vessel and heated to about 200 to 210° C. with stirring. When the thickener was completely dissolved, the heating operation was stopped and the reaction system was subsequently cooled. Then, the reaction product was kneaded using a three-roll mill, thereby obtaining an intended grease composition.

Example 3

A whole amount of the base oil and a whole amount of the thickener (i.e., silica with a primary particle size of 0.012 μm) shown in Table 1 were placed in a reaction vessel and stirred. The reaction product was then kneaded using a three-roll mill, thereby obtaining an intended grease composition.

Test Methods (1) Kinematic viscosity (40° C.) of base oil by JIS K2220.23
(2) Viscosity-pressure coefficient (α) of base oil: $GPa^{-1}$ (25° C.)

The oil film thickness was first determined using an instrument for measuring the EHL oil film thickness by optical interference method. The test was conducted at 25° C., with the surface pressure and the speed being set at 0.56 Gpa and 1.0 m/s, respectively.

Next, the viscosity-pressure coefficient α ($GPa^{-1}$) was obtained by substituting the respective values into the Hamrock-Dowson equation as mentioned above.

Evaluation: The value α of 20 or more was evaluated as acceptable (○), and the value α of less than 20 was evaluated as unacceptable (x).

(3) Flash point (° C.) of base oil by JIS K2220.24 (Cleveland open-cup method)

Evaluation: The flash point of 200 or more was evaluated as acceptable (○), and the flash point of less than 200 was evaluated as unacceptable (x).

[Chemical Formula 1]

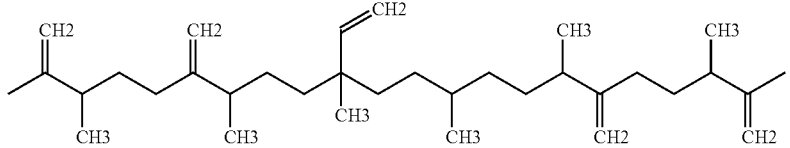

Example 1 and Comparative Example 1

A half amount of the base oil and a whole amount of diphenylmethane-4,4'-diisocyanate shown in Table 1 were placed in a reaction vessel and heated to 70 to 80° C. Another half amount of the base oil and the whole amounts of octadecylamine and cyclohexylamine were placed in another vessel and heated to 70 to 80° C., and subsequently added to the former reaction vessel, followed by stirring. Stirring was continued for about 30 minutes as it was although the temperature of the reaction system increased because of the exothermic reaction. After the reaction was allowed to proceed sufficiently, the temperature of the reaction system was elevated to 155° C., and then cooled. Finally, the reaction product was kneaded using a three-roll mill, thereby obtaining an intended grease composition.

(4) Worked penetration by JIS K2220.7
(5) Maximum traction coefficient

The traction coefficient was determined using a ball on disc EHL test device.

A steel disk was rotated at a rotational speed (Ud) and a ball was not fixed but rotated at a rotational speed (Ub). The rotational axis of the ball deviated from the center of the disk. The traction in the axial direction of the ball due to the occurrence of sliding Us (i.e., sliding speed with respect to rolling of the ball) was detected using a load cell. The ratio of the maximum traction to the load was regarded as the maximum traction coefficient.

Test Conditions

Maximum Hertzian pressure: 0.711 GPa
Speed: 0.5 m/s
Temperature: 25° C.

Evaluation: The maximum traction coefficient of 0.070 or more was evaluated as (○); 0.030 to 0.070, as (Δ); and less than 0.030, as (x).

(6) SRV test in accordance with ASTM D5707

Test Conditions
Temperature: 50° C.
Frequency: 50 Hz
Stroke amplitude: 1 mm
Duration: 2 hours
Load: 100 N Evaluation: The coefficient of friction of 0.250 or less was evaluated as acceptable (○); and the coefficient of friction of 0.250 or more was evaluated as unacceptable (x).

The area of wear scar ($mm^2$) of less than 1.0 was evaluated as acceptable (○) and the area of wear scar of 1.0 or more was evaluated as unacceptable (x).

TABLE 1

| | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Thickener | Type | Urea | Li soap | Silica | Urea | Li-complex soap | Li soap | none |
| | Content (mass %) | 8.0 | 8.0 | 8.0 | 4.57 | Unknown (*) | Unknown (*) | 0 |
| Base Oil | Type | Botryococcus oil | | | Squalene, Squalane, PAO | Dimethyl silicone | PAO | Synthetic naphthene oil |
| | Kinematic viscosity ($mm^2/s$) | 14.3 | | | 14.9 | 139 | 17 | 39.1 |
| | Viscosity-pressure coefficient α ($GPa^{-1}$) | 57.8 | | | 13.5 | 13.56 (*2) (20° C.) | 17.3 (*3) (40° C.) | 34.5 (*1) (30° C.) |
| | | ○ | | | x | x | x | ○ |
| | Flash point (° C.) | 208 | | | 205 | 330 | 228 | 165 |
| | Evaluation of flash point | ○ | | | ○ | ○ | ○ | x |
| Hardness | Worked penetration | 302 | 269 | 227 | 435 | 305 | 280 | — |
| Traction Properties | Maximum traction coefficient | 0.091 | 0.082 | 0.084 | 0.053 | 0.083 | 0.042 | 0.125 |
| | | ○ | ○ | ○ | Δ | ○ | Δ | ○ |
| Lubricating Properties | SRV coefficient of friction | 0.122 | 0.135 | 0.149 | 0.178 | 0.975 | 0.097 | 0.147 |
| | Evaluation of friction coefficient (100N) | ○ | ○ | ○ | ○ | x | ○ | ○ |
| | Area of wear scar (SRV test) (100N), $mm^2$ | 0.372 | 0.277 | 0.153 | 0.279 | 16.17 | 0.149 | 0.253 |
| | Evaluation of wear scar area (SRV test) (100N), $mm^2$ | ○ | ○ | ○ | ○ | x | ○ | ○ |

*Cited from references
1: Muraki, Jyunkatsu, Vol. 33 No. 1 (1988) 36-39
2: M. Ziaur Rahman et al., Tribology Transaction Vol. 46 (2003), 4, 499-505
3: Hata & Miyaji, Jidousya Gijyutu, Vol. 58, No. 4, (2004) 59
*The amount of thickener was unknown because of the commercially available product.

The invention claimed is:

1. A grease composition comprising a thickener and a base oil, wherein the base oil comprises at least one of;

(a) an unsaturated hydrocarbon oil extracted from *Botryococcus braunii* or (b) a hydrocarbon oil obtained by partially hydrogenating the hydrocarbon oil (a).

2. The grease composition of claim 1, wherein the hydrocarbon oil (a) is produced by extracting from *Botryococcus braunii* with hexane.

3. The grease composition of claim 1, wherein the hydrocarbon oil (a) is a hydrocarbon oil extracted from *Botryococcus braunii* deposited as Accession No. tsukuba-1 FERM P-22046.

4. The grease composition of claim 1, wherein the hydrocarbon oil (a) is a branched hydrocarbon oil having a triterpene structure composed of isoprene units.

5. The grease composition of claim 1, wherein the hydrocarbon oil (a) has a methyl group.

6. The grease composition of claim 1, wherein the hydrocarbon oil (a) comprises a hydrocarbon represented by formula (1):

[Chemical Formula 1]

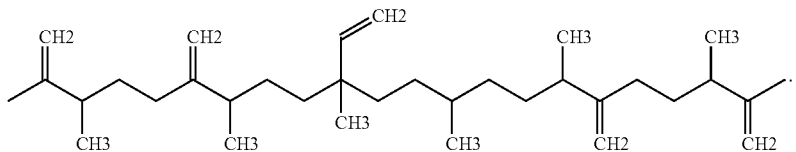

7. The grease composition of claim 1, wherein the at least one of the hydrocarbon oil (a) and the hydrogenated hydrocarbon oil (b) is contained in an amount of 10 mass % or more with respect to the total mass of the base oil.

8. The grease composition of claim 1, wherein the thickener is at least one selected from the group consisting of metallic soaps, complex metallic soaps, urea compounds and silica.

9. The grease composition of claim 1, wherein the thickener is a urea compound represented by formula (2):

$$R_1\text{—NHCONH—}R_2\text{—NHCONH—}R_3 \quad (2)$$

wherein $R_1$ and $R_3$ may be the same or different from each other and are each independently a hydrocarbon group having 4 to 20 carbon groups, and $R_2$ is an aromatic hydrocarbon group having 6 to 15 carbon atoms.

10. A power transmission mechanism wherein the grease composition of claim 1 is enclosed.

11. A bearing wherein the grease composition of claim 1 is enclosed.

12. A method for lubricating contacting surfaces of a power transmission mechanism or bearing comprising applying to the surfaces a grease composition which comprises a thickener and a base oil, wherein the base oil comprises at least one of;
(a) a hydrocarbon oil extracted from *Botryococcus braunii* or
(b) a hydrocarbon oil obtained by partially hydrogenating the hydrocarbon oil (a).

13. The method of claim 12, wherein the hydrocarbon oil (a) is produced by extracting from *Botryococcus braunii* with hexane.

14. The method of claim 12, wherein the hydrocarbon oil (a) is a hydrocarbon oil extracted from *Botryococcus braunii* deposited as Accession No. tsukuba-1 FERM P-22046.

15. The method of claim 12, wherein the hydrocarbon oil (a) is a branched hydrocarbon oil having a triterpene structure composed of isoprene units.

16. The method of claim 12, wherein the hydrocarbon oil (a) has a methyl group.

17. The method of claim 12, wherein the hydrocarbon oil (a) comprises a hydrocarbon represented by formula (1):

[Chemical Formula 1]

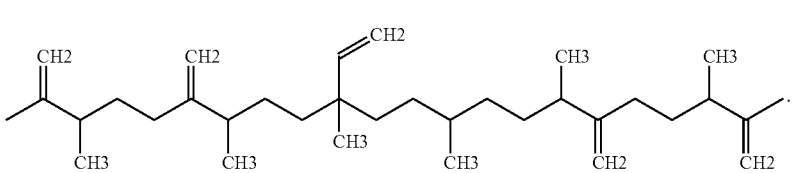

18. The method of claim 12, wherein the at least one of the hydrocarbon oil (a) and the hydrogenated hydrocarbon oil (b) is contained in an amount of 10 mass % or more with respect to the total mass of the base oil.

19. The method of claim 12, wherein the thickener is at least one selected from the group consisting of metallic soaps, complex metallic soaps, urea compounds and silica.

20. The method of claim 12, wherein the thickener is a urea compound represented by formula (2):

$$R_1\text{—NHCONH—}R_2\text{—NHCONH—}R_3 \quad (2)$$

wherein $R_1$ and $R_3$ may be the same or different from each other and are each independently a hydrocarbon group having 4 to 20 carbon groups, and $R_2$ is an aromatic hydrocarbon group having 6 to 15 carbon atoms.

21. The grease composition of claim 2, wherein the hydrocarbon oil (a) is a hydrocarbon oil extracted from *Botryococcus braunii* deposited as Accession No. tsukuba-1 FERM P-22046.

22. The method of claim 13, wherein the hydrocarbon oil (a) is a hydrocarbon oil extracted from *Botryococcus braunii* deposited as Accession No. tsukuba-1 FERM P-22046.

* * * * *